United States Patent
Contreras et al.

(10) Patent No.: US 11,221,895 B2
(45) Date of Patent: *Jan. 11, 2022

(54) SYSTEMS AND METHODS FOR DELIVERING MESSAGES TO OFFLINE USERS

(71) Applicant: Braze, Inc., New York, NY (US)

(72) Inventors: Julian Contreras, New York, NY (US); James Doheny, IV, New York, NY (US); Leonid Fishler, Long Island City, NY (US)

(73) Assignee: Braze, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,547

(22) Filed: Sep. 3, 2020

(65) Prior Publication Data
US 2021/0103486 A1    Apr. 8, 2021

Related U.S. Application Data

(63) Continuation of application No. 16/593,436, filed on Oct. 4, 2019, now Pat. No. 10,810,066.

(51) Int. Cl.
*G06F 9/54* (2006.01)
*G06F 11/34* (2006.01)

(52) U.S. Cl.
CPC .............. *G06F 9/546* (2013.01); *G06F 9/542* (2013.01); *G06F 11/3438* (2013.01)

(58) Field of Classification Search
CPC ............................ G06Q 30/0267; H04L 67/26
See application file for complete search history.

(56) References Cited

U.S. PATENT DOCUMENTS

| | | | |
|---|---|---|---|
| 10,810,066 B1* | 10/2020 | Contreras | G06F 9/546 |
| 2006/0242587 A1 | 10/2006 | Eagle | |
| 2014/0019253 A1 | 1/2014 | Ricasata | |
| 2015/0186941 A1 | 7/2015 | Anthony | |
| 2016/0350810 A1 | 12/2016 | Smirnov | |
| 2017/0243250 A1 | 8/2017 | Carolan | |
| 2018/0041943 A1 | 2/2018 | Visuri | |
| 2018/0152533 A1 | 5/2018 | Sharda | |
| 2019/0087863 A1 | 3/2019 | Mannix | |
| 2019/0320442 A1* | 10/2019 | Thies | H04W 72/0493 |
| 2020/0314797 A1* | 10/2020 | Mei | H04L 63/08 |
| 2021/0105233 A1* | 4/2021 | Tran | H04L 51/26 |

OTHER PUBLICATIONS

Push Technology, "Diffusion 6.2.1. User Manual" (Oct. 28, 2018), pp. 1-7 [retrieved from https://docs.pushtechnology.com/docs/ 6. 2. 1 /manual/html/developerguide/client/basics/reconnecting_strategy. html].

* cited by examiner

*Primary Examiner* — Brian W Wathen
(74) *Attorney, Agent, or Firm* — FisherBroyles, LLP (57) ABSTRACT

Systems and methods for presenting a message to a user via a user's computing device are configured to cause the message to be presented to the user while the user's computing device is not connected to the Internet. In part, this is accomplished by setting up a trigger condition for presentation of the message, where the trigger condition is that the user's computing device is not connected to the Internet. Information about the message and the trigger condition are delivered to the user's computing device in advance of when the user's computing device becomes disconnected from the Internet.

19 Claims, 8 Drawing Sheets

SYSTEMS AND METHODS FOR DELIVERING MESSAGES TO OFFLINE USERS

This application is a Continuation of U.S. application Ser. No. 16/593,436, which was filed on Oct. 4, 2019, the content of which is incorporated herein by reference.

BACKGROUND OF THE INVENTION

The invention is related to systems and methods for enhancing customer engagement. In part, this is accomplished by sending messages to users. The messages could be mobile or browser-based push notifications, text (SMS/MMS) messages, email messages, in-application messages, or an audio recording that is sent to users via a telephony system. Such messages are delivered to a user via a user's computing device. The present invention is focused on delivering one or more messages to a user while the user's computing device is not connected to the Internet.

Companies also often engage a customer engagement service to help manage the delivery messages to their customers. The customer engagement service can help control the flow and timing of messages to provide the customers with an enjoyable and informative experience. For example, some customers that are highly engaged with a company may wish to receive messages from the company on a frequent basis. Conversely, customers that are not highly engaged with the company may find frequent messages from the company undesirable. The customer engagement service can help determine what individual customers desire, and then manage the flow of messaging to customers based on their individual desires.

The customer engagement service can also cause messages to be delivered to customers at opportune times when the messaging may have the most influence over customer behavior. Similarly, the customer engagement service may know when certain types of message will have the greatest value to customers, and then seek to deliver the messages at those times.

Companies often provide a software application to their customers that the customers install on a computing device such as a laptop computer, a desktop computer, a tablet or a smartphone. The software applications can provide a wide array of functionality or information to customers depending on what types of goods and services the company provides to its customers. For example, an online retailer may provide its customers with a software application that makes it easy for customers to make online purchases. A media company may provide its customers with a software application that makes it easy for the customers to access and watch media content.

Regardless of the type of software application that a company provides to its customers, it is often possible to deliver messages to the customers via the software application while they are using the company's software application. Such messages are referred to as in-application or "in-app" messages.

One way that the customer engagement service can control the delivery of in-application messages to users is via "campaigns." The company or the customer engagement service can configure a campaign to deliver specific in-application messages to a user upon the occurrence of one or more specific triggering events. For example, if the user makes a purchase from the company using the company's software application, the purchase could be the triggering event that causes an in-application thank you message to be delivered to the user via the software application.

In most instances, a user's computing device receives instructions to present a user with a message via a data network, such as the Internet. Instructions to present a message may also be received via a push notification. Receipt of those instructions requires that the user's computing device be connected to the Internet or to a cellular telephony system. When a user's computing device is not connected to the Internet or to a cellular telephony system, it is usually impossible to receive messaging instructions. As a result it is typically not possible to cause a message to be presented to a user when the user's computing device is not connected to either the Internet or to a cellular telephony system.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. As mentioned above, a customer engagement service helps a company interact with its users to enhance the customer experience and to increase the company's business, revenue and/or stature. One of the ways that a customer engagement service assists a company is by helping the company to manage how and when messages are delivered to the company's customers.

The following description refers to "clients" and to "users". For purposes of this discussion, a "client" would be a client of the customer engagement service. In other words, a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in many different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future.

Figure 1:
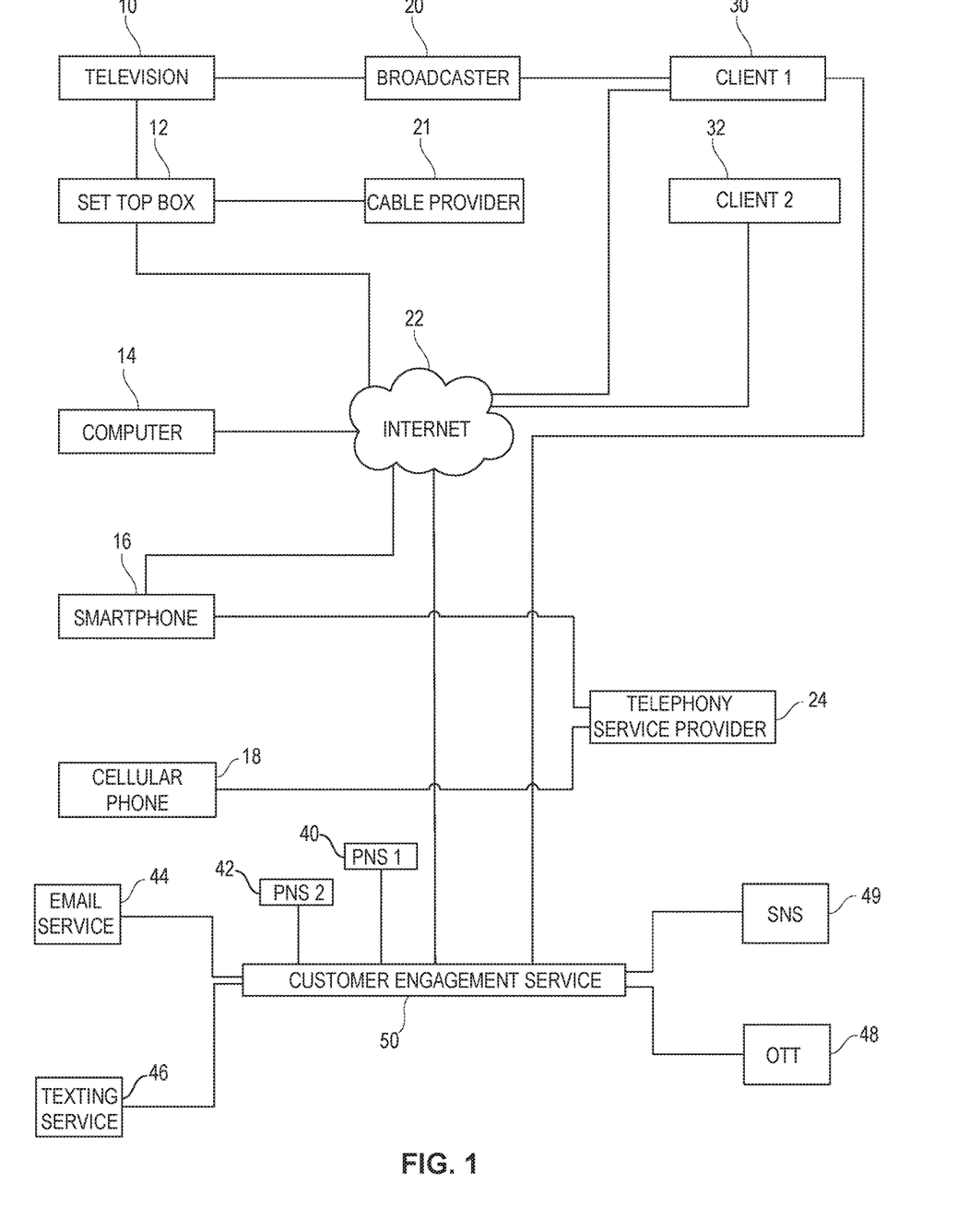
FIG. 1 is a diagram of a communications environment which could be utilized by systems and methods embodying the invention.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
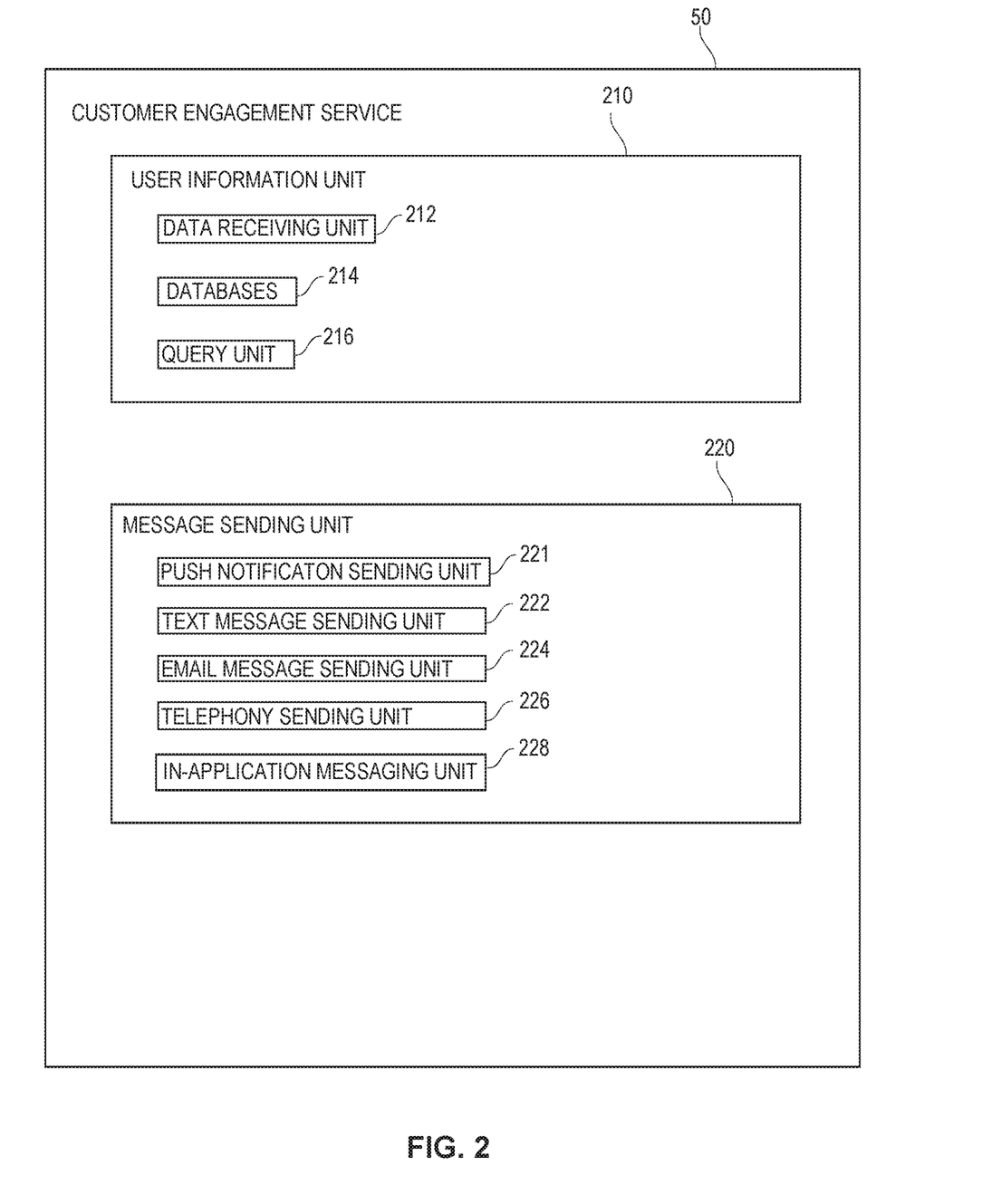
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send the data about the purchase made by that user to the data receiving unit 212. As will be explained below, information received by the data receiving unit 212 may satisfy a trigger for causing an in-application message to be presented to a user.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding user contacts with the client, the customer engagement service 50 may learn that shortly after an individual user received a message from the client, the user logged into the client's website. Or that shortly after the user received a message, the user opened a software application provided by the client. For all these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing messages to be delivered to a user via a client's software application that it provides to its users. For this reason, the in-application messaging unit 228 can interact with an instantiation of a client's software application that is resident on a user's computing device, as will be explained in detail below.

The foregoing and following descriptions refer to "campaigns." A campaign is a designed to deliver one or multiple messages to one or more users upon the occurrence or satisfaction of one or more trigger conditions. A client or the customer engagement service 50 can setup and configure a campaign to present specific messages to one or more users. The message that is presented could be a predetermined message. Alternatively, the message could be generated using a template that is completed with acquired information. The information that is inserted into a message template could be specific to the user to which the message is presented, or it could be more general in nature.

Part of setting up or configuring a campaign is establishing the trigger conditions that must occur in order for the campaign to deliver a message to one or more users. In some instances, only a single trigger condition need be satisfied for a campaign to deliver a message to one or more users. In other instances, multiple trigger conditions must all occur before the campaign will cause a message to be presented to one or more users. As will be explained below, boolean logic can be used to define a set of trigger conditions that must be satisfied before a campaign will cause a message to be sent to one or more users.

Figure 3:
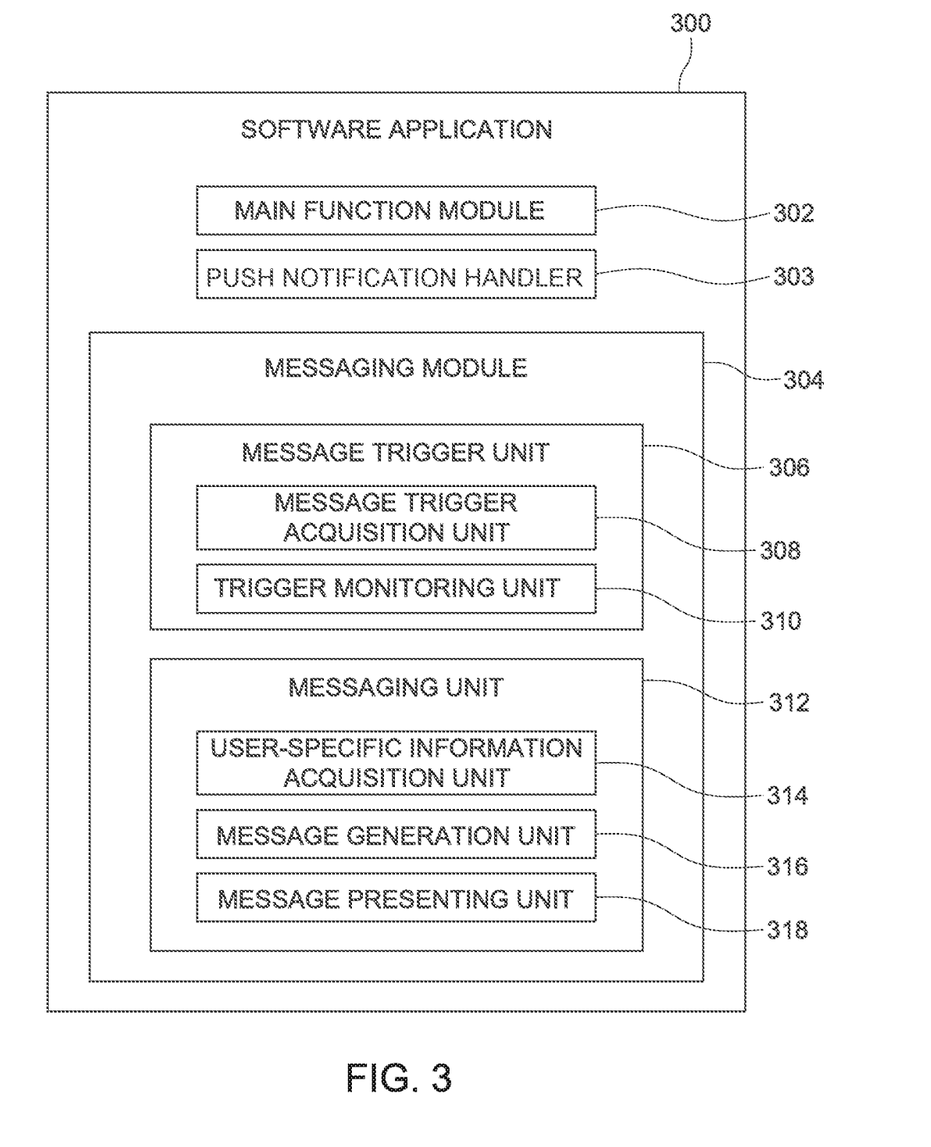
FIG. 3 is a diagram illustrating various elements of a company's software application that is provided to the company's customers.

A campaign could be implemented by the message sending unit 220 of the customer engagement service. Alternatively, a campaign may be implemented by elements of a software application 300 that is running on a user's computing device.

Information relating to a user's activities may be provided to or reported to the in-application messaging unit 228 by a client or a third-party server. For example, a client's server may report that a user has made a purchase from the client, and that information could be delivered to or reported to the in-application messaging unit 228. The fact that the user made a purchase from the client could satisfy a trigger for a messaging campaign that causes an in-application message to be presented to the user. In this example, a user's activity satisfied a trigger for a message campaign. However, in other instances the receipt of other types of information not related to user activity might also satisfy a trigger of a message campaign. Details about how this occurs are provided below.

FIG. 3 illustrates selected elements of a client's software application that would be provided to the client's customers or users. The software application 300 includes a main functions unit 302, which provides one or more functions to the user. The actual function(s) would vary greatly from client to client. For example, if the client is an online retailer, the main functions unit 302 could be configured to allow a user to make online purchases. If the client was a media company, the main functions unit 302 could provide the user with a way of accessing and watching media content provided by the client.

The software application 300 also includes a push notification handler 303. The push notification handler 303 is configured to receive push notifications that have been sent by one or more push notification services 40/42 at the request of a customer engagement service, or some other party. In some embodiments, information extracted from a push notification by elements of a user's computing device are passed to the push notification handler 303. The push notification handler 303 may then pass along information and messaging instructions included in the received push notification to a messaging module 304 of the software application.

Messaging instructions included within a push notification may be sent to a user's computing device to cause the messaging module 304 of the software application 300 to present a message to a user. The message that is ultimately presented to the user could be an in-application message, a push notification or some other form of message.

The messaging module 304 includes a messaging unit 312 that is configured to cause a message to be played or displayed to the user when one or more trigger conditions are satisfied. A message trigger acquisition unit 308 of a message trigger unit 306 can receive information about the trigger conditions that must be satisfied before a message is presented to the user. The information about the trigger conditions could be received via a push notification. Alternatively, the message trigger acquisition unit 308 may communicate with the message sending unit 220 of a customer engagement service 50 to obtain information about the trigger conditions under which a message is to be displayed/played to the user. A trigger monitoring unit 310 monitors those conditions to determine when the trigger conditions have been satisfied such that it is time to display/play a particular in-application message to the user.

Information about a message that is to be presented to a user, and the associated trigger conditions that must be satisfied before the message is presented to the user could also be received by the software application in other ways. For example, when the software application 300 is first run on the user's computing device, it could register with the customer engagement service 50. Part of that registration process could include receiving data communications from the customer engagement service 50 that provide messaging instructions. In still other instances, the message sending unit 220 of the customer engagement service could send messaging instructions to the software application long after registration has occurred when the message sending unit 220 determines that a new message should be presented to the user.

In some instances, information about a message that is to be presented to a user may be stored in the messaging unit 312. In other instances, the messaging unit 312 may obtain all or a portion of a message from the message sending unit 220 of the customer engagement service 50. In some instances, a message generation unit 316 may generate a message using a message template and acquired information. In other instances, the messaging unit 312 may obtain the entire message that is to be displayed or played to a user from the message sending unit 220 of the customer engagement service 50, from the client that provided the software application 300, or from a third party. Regardless of whether the message is pre-stored in the messaging unit 312, obtained or generated, a message display unit 318 causes the message to be displayed/played to the user.

In some instances, a user-specific information acquisition unit 314 obtains user-specific information about the user, and the message generation unit 316 then generates a message using the obtained user-specific information.

As mentioned above, the message that is ultimately displayed/played to the user may be generated using a message template. The message template can be created by the client that provided the software application 300, or by the customer engagement service 50. In simple examples, a message template is configured such that customer-specific information, or other forms of information, can be inserted into the message template to generate a personalized or customized message.

A message template can also include sections that will be completed or filled in by evaluating conditional statements or boolean logic-based statements. The conditional statements or boolean logic-based statements can seek information from the customer engagement service 50, the client that provided the software application or from a third-party source in order to determine whether and/or how to complete a portion of a message template, to thereby generate a message that can be played to displayed to a user.

For example, a portion of the message template may call for an image to be displayed, where the image is intended to represent the prevailing weather at the user's present location. For this to work, conditional statements or boolean-logic-based statements in this portion of the message template are used to determine where the user is presently located, and then the prevailing weather at that location. Then, based on the prevailing weather, a suitable image is obtained and inserted into the message.

The way in which a message trigger is satisfied may also be relevant and used to determine what information to insert into a message template to generate a message that will be displayed or played to the user. For example, if the message trigger is the user playing a video, the type of video that the user played may be used to determine how to generate the message that is ultimately generated and displayed or played to the user. As a result, when the user-specific information acquisition unit 314 requests user-specific information that is needed to generate a message, that request may provide information about how the message trigger was satisfied. The entity that then provides the user-specific information may use the information about how the trigger was satisfied to determine what sort of user-specific information to provide back to the user-specific information acquisition unit 314.

The message trigger itself may include conditional statements or boolean logic-based statements that control what happens when a message trigger is satisfied. For example, if the message trigger is the user playing a video, the message trigger could further specify that if the user played a video relating to sports, the user-specific information acquisition unit 314 should seek user-specific information from entity X, whereas if the user plays a video relating to nature, the user-specific information acquisition unit 314 should seek user-specific information from entity Z.

The conditional statements and boolean logic-based statements within a message template can even determine whether a message is to be displayed or played to the user. For example, a message template may include a conditional statement or boolean logic-based statement that indicates that under certain conditions the message should be displayed to the user, and under certain other conditions the message should not be displayed to the user.

Because the message triggers of a campaign and the message templates can utilize conditional statements and boolean logic-based statements to determine when to deliver a message to a user, and whether and how to generate a message for a user, highly sophisticated personalization for individual users can be achieved. Personalization that goes far beyond simply inserting user-specific characteristics or data (such as a user's name or address) into a message template.

The following description and claims refer to information specific to a user, or user-specific information. Those phrases are intended to encompass simple user characteristic data, such as the user's name and physical characteristics. However, those phrases are also intended to encompass data that is obtained or determined or generated by evaluating conditional statements or boolean logic-based statements within a message template or message trigger. Evaluating the conditional statements and/or boolean logic-based statements may require using simple user characteristics to determine whether and how to generate the message for the user. However, in other instances, no user characteristic data may be needed to evaluate a conditional statement or boolean logic-based statement. Regardless, for purposes of the following discussion, the phrases information specific to a user and/or user-specific information is intended to encompass data that is obtained or determined or generated by evaluating conditional statements or boolean logic-based statements within a message template or message trigger.

The present application is concerned with causing a message to be presented to a user when the user's computing device is not connected to the Internet. For example, the invention is concerned with causing a message to be presented to a user when the user is on a flight and the user's computing device has no connectivity to the Internet. For this reason, at least one of the trigger conditions for presenting the message would be that the user's computing device is not connected to the Internet.

Figure 4:
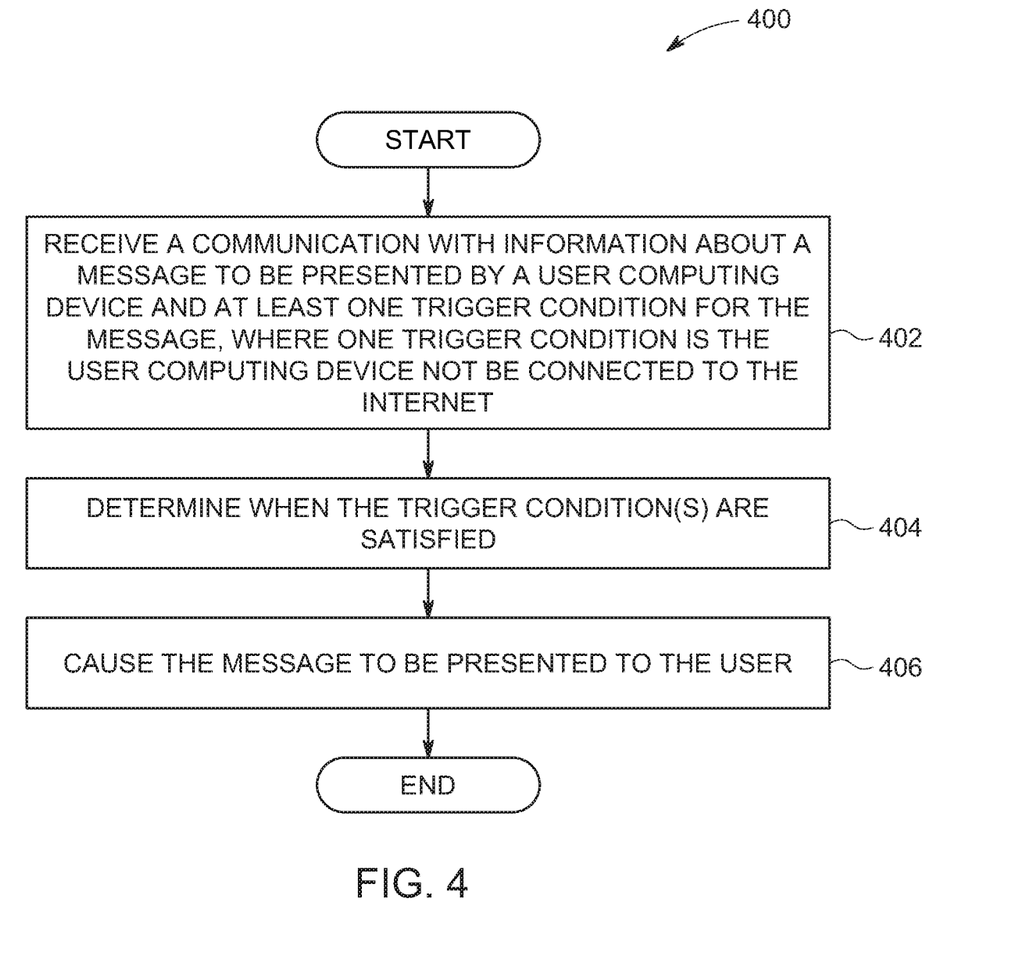
FIG. 4 is a flowchart illustrating steps of a first method embodying the invention that would be performed by elements of a user computing device.

FIG. 4 illustrates steps of a generalized method that may be performed by elements resident on a user computing device to cause a message to be presented to a user when the user computing device is not connected to the Internet. The method 400 begins and proceeds to step 402, where some element on the user computing device receives information about the message and about trigger conditions that must be satisfied before the message is presented to the user. One of the trigger conditions is that the user computing device not be connected to the Internet.

The information about the message and the trigger condition(s) can be received as part of a data communication sent to the element on the user computing device. Alternatively, the information could be included in a silent push notification sent to the user computing device.

In step 404, some element on the user computing device monitors the trigger conditions to determine when the trigger conditions are satisfied. One of those trigger conditions is that the user computing device not be connected to the Internet. If that is the only trigger condition, then the message may be displayed to the user as soon as the user computing device becomes disconnected from the Internet. If the user computing device is not active when it becomes disconnected from the Internet, the message may not be displayed until the user activates the user computing device after the user computing device has become disconnected from the Internet.

A software application running on the user computing device, such as a client software application 300, can detect whether there is a network connection. Thus, the trigger monitoring unit 310 of the software application could periodically check for a network connection to determine when the user computing device becomes disconnected from the Internet. Also, the check that is performed may be repeated two or more times at short intervals of several minutes to ensure that the lack of a network connection is not a temporary one. In this instance, the trigger condition of being disconnected from the Internet would only be deemed satisfied if multiple checks for network connectivity indicate that there is no connection to the Internet.

In addition, the operating system of a user computing device can check for network connectivity, and then report to the client software application 300. For example, the client software application 300 can request that the operating system inform the software application 300 when there is a change in network connectivity. When the operating system reports that there is no network connectivity, the client software application could then present the user with a message, possibly in the form of an in-application message. Alternatively, the software application could cause the operating system to present the user with a push notification.

In some embodiments, the trigger conditions may specify that the message is not to be presented to the user until a predetermined period of time has elapsed since the user computing device became disconnected from the Internet. In some instances, the trigger conditions may specify that the message is not be presented to the user until after a specific scheduled time. In still other instances, the trigger condition specifying that the user computing device be disconnected from the Internet may be paired with one or more other trigger conditions that also must be satisfied before the message is to be presented to the user.

Once the trigger conditions for presentation of the message have been satisfied, the method proceeds to step 406, and the message is presented to the user. This can be accomplished in multiple different ways.

In some embodiments, the message presenting unit 318 of a client software application 300 on the user computing device can present the user with an in-application message once the trigger monitoring unit determines that the user computing device has become disconnected from the Internet, and once any other trigger conditions for presenting the in-application message have also be satisfied. Alternatively, the message presenting unit may cause a push notification to be presented to the user. These actions could occur regardless of whether the client software application 300 is in the background or the foreground of the operating system.

In some embodiments, a software application could receive a silent push notification that contains instructions to cause a push notification to be presented to the user when the user's computing device has become disconnected from the Internet. the software application 300 could then provide instructions to the operating system of the user computing device to carry out this process. The operating system would be instructed to periodically check for Internet connectivity, and when the operating system determines that there is no Internet connectivity, the operating system is to present the user with a push notification. Thus, the client software application can instruct/schedule the presentation of the push notification with the assistance of the operating system.

Figure 5:
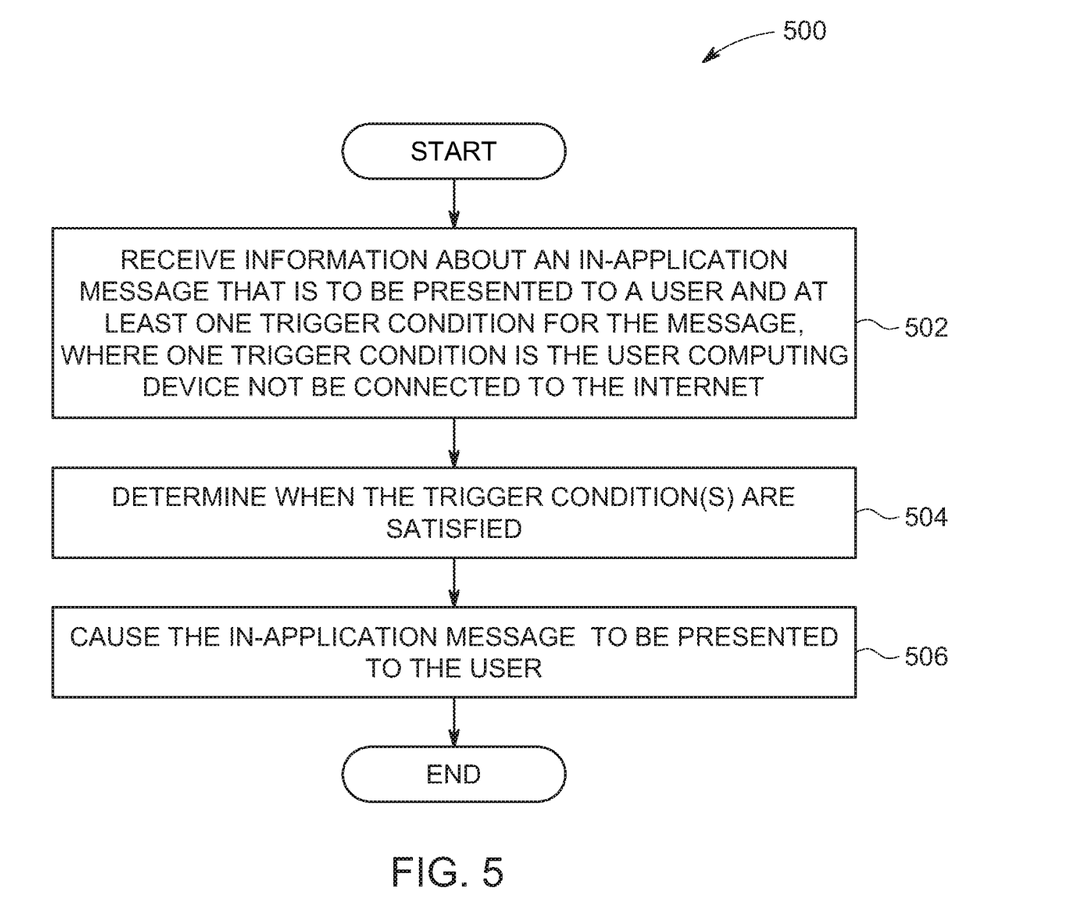
FIG. 5 is a flowchart illustrating steps of a second method embodying the invention that would be performed by elements of a company's software application.

While FIG. 4 illustrates a generalized method embodying the invention, FIG. 5 illustrates steps of a more specific method embodying the invention. In this method, a client's software application 300 on a user computing device receives instructions on presenting an in-application message to the user, where the message is to be presented to the user while the user computing device is not connected to the Internet.

This method 500 begins and proceeds to step 502, where a client's software application 300 on a user computing device receives information about an in-application message that is to be presented to a user, and at least one trigger condition, where one of the trigger conditions is that the user computing device not be connected to the Internet. The messaging instructions could be received via data communications passing between the software application 300 and an in-application messaging unit 228 of a customer engagement service 50. Alternatively, the messaging instructions could be received via a silent push notification sent to the user computing device. In still other instances, the messaging instructions could be received in other ways.

In step 504, a trigger monitoring unit 310 of the message trigger unit 306 of the software application 300 determines when all of the trigger conditions associated with the message are satisfied. This would include determining that the user computing device is not connected to the Internet. When the trigger monitoring unit 310 determines that all trigger conditions are satisfied, in step 506 the message presenting unit 318 of the software application 300 causes the in-application message to be presented to the user. The message then ends.

Figure 6:
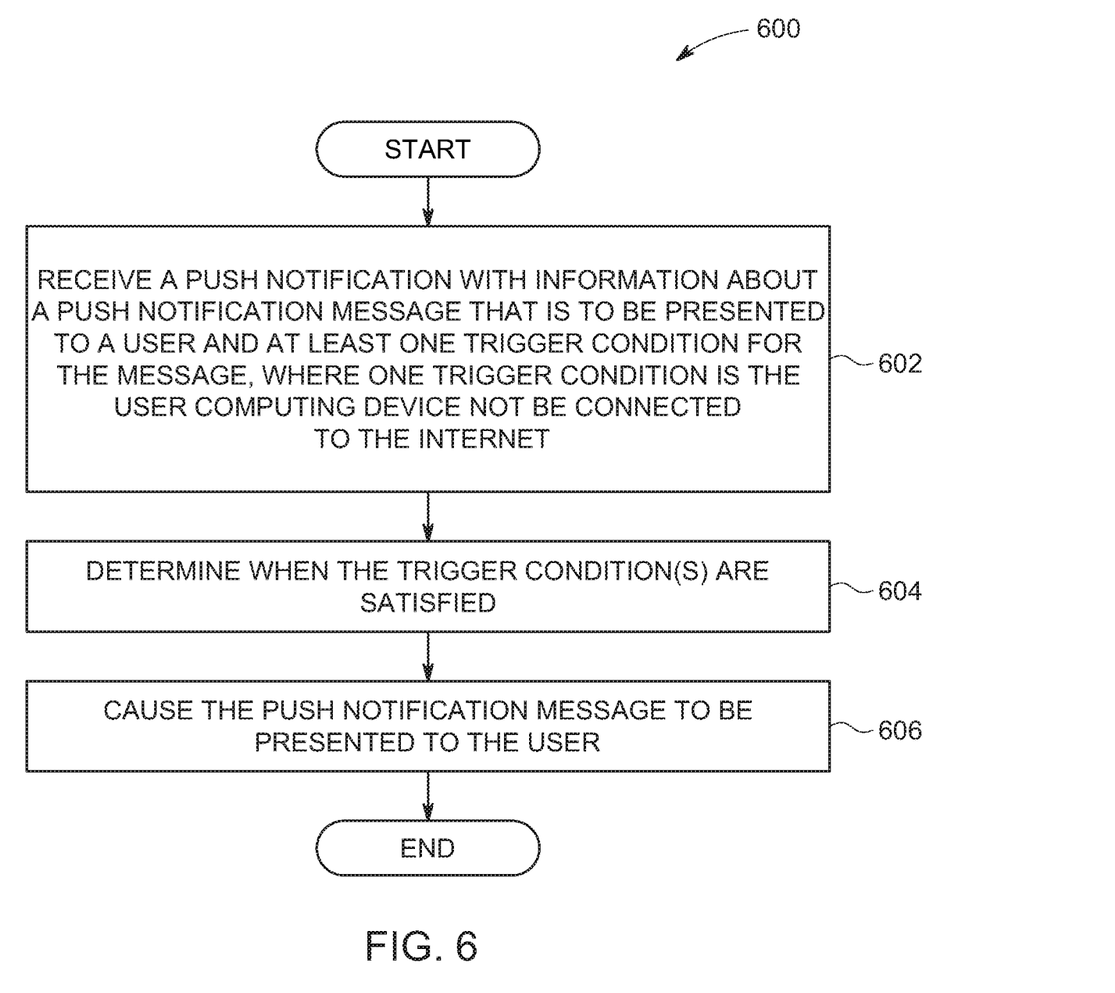
FIG. 6 is a flowchart illustrating steps of a third method embodying the invention that would be performed by elements present on a user's computing device.

FIG. 6 illustrates steps of another specific method in which a push notification message is to be displayed to a user when the user's computing device is not connected to the Internet. The method 600 begins and proceeds to step 602 where a silent push notification is received at the user computing device, the silent push notification including information about a push notification message that is to be presented to a user, and at least one trigger condition for the message, where one trigger condition is that the user computing device not be connected to the Internet.

In step 604 some element of the user computing device monitors the trigger conditions to determine when the trigger conditions are satisfied. This element of the user computing device could be the trigger monitoring unit 310 of a client software application 300 on the user computing device. Alternatively, this element could be a dedicated software application installed on the user computing device that is designed to receive a silent push notification with messaging instructions, to monitor for when trigger conditions are satisfied, and to then cause a push notification message to be presented to the user when the trigger conditions are satisfied. For example, when the client software application 300 receives the silent push notification, it could instruct the operating system to monitor for Internet connectivity, and to present the user with a push notification when the operating system determines there is no Internet connectivity.

The instruction sent to the operating system could also indicate other trigger conditions that must also be satisfied before the push notification is presented to the user. For example, the instructions sent to the operating system could specify that there must be no Internet connectivity for a predetermined period of time before the push notification is presented to the user. In other instances, the instructions sent to the operating system could specify that there be no Internet connectivity, and that the push notification should be presented to the user at a specified scheduled time. In still other instances, other trigger conditions may also be specified.

Regardless, when all the trigger conditions are satisfied, including that the user computing device is not connected to the Internet, the method proceeds to step 606 where the push notification message is presented to the user. The push notification could be presented to the user by the operating system of the user computing device, under instructions from a client software application. The method then ends.

Figure 7:
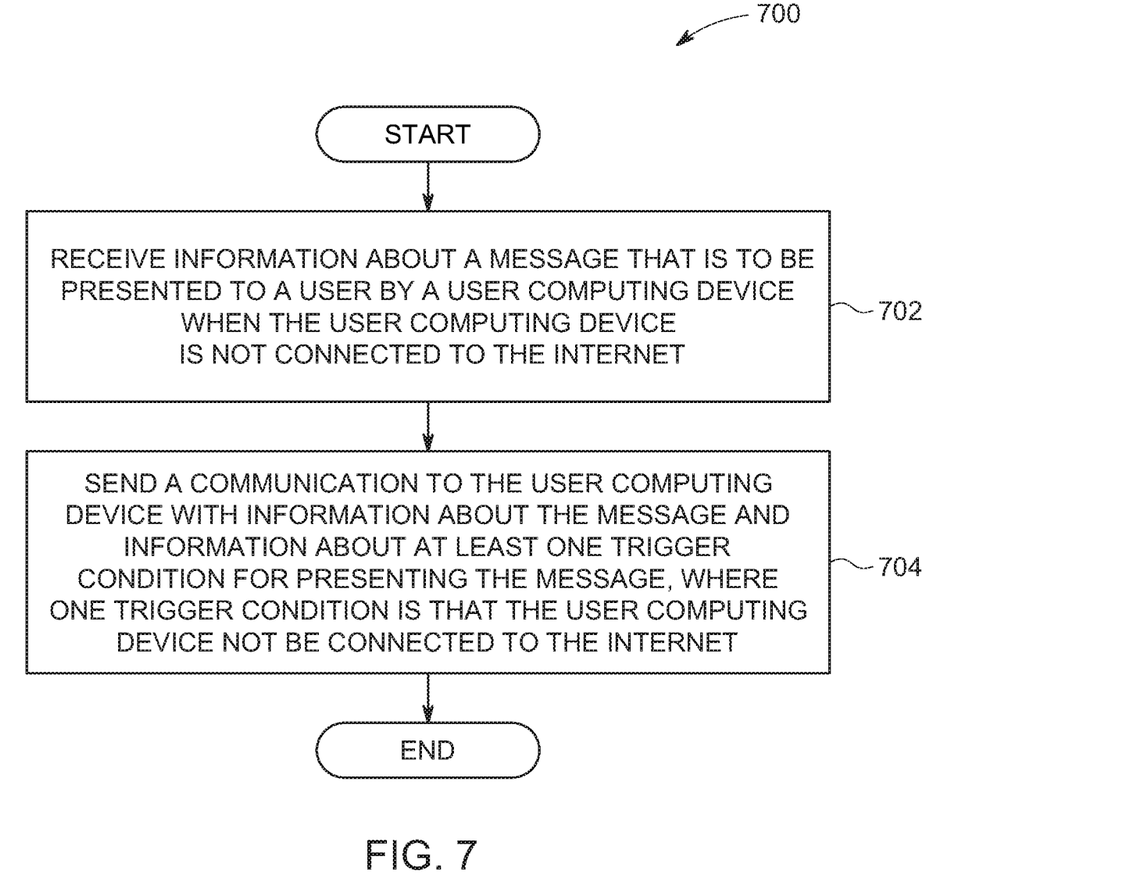
FIG. 7 is a flowchart illustrating steps of another method embodying the invention that would be performed by elements of a customer engagement service.

FIG. 7 illustrates steps of a method that would be performed by elements of the customer engagement service 50 as part of a process of causing a message to be displayed to a user while the user's computing device is not connected to the Internet. The method 700 begins and proceeds to step 702, where an element of the customer engagement service 50 receives information about a message that is to be displayed to a user while the user's computing device is not connected to the Internet. This information could be received from client that wishes for one of its users to receive the message.

In step 704, an element of the message sending unit 220 of the customer engagement service 50 sends a communication to the user computing device with information about the message and at least one trigger condition for the message, where one condition is that the user computing device not be connected to the Internet. The information could be sent as a silent push notification that the push notification sending unit 221 causes to be sent to the user computing device. Alternatively, the information could be sent to a client software application 300 on the user's computing device by the in-application messaging unit 228 of the customer engagement service 50. In other instances, the messaging information could be sent in other ways by some other element of the message sending unit 220 of the customer engagement service 50.

In the methods discussed above, information about a message that is sent to a user computing device could include the entire message that is to be presented to the user. Alternatively, the message information sent to the user computing device could be a message template that is to be completed by some element on the user computing device before the message is displayed to a user, such as by a message generation unit 316 of a client software application 300. In still other instances, the message information sent to the user computing device could be specific pieces of information that are to be inserted into a message template that has already been sent to the user computing device.

Also, once messaging instructions about a message that is to be presented to a user while the user's computing device is not connected to the Internet have been sent to the user computing device, a subsequent instruction could be sent to cancel the message. If the user's computing device was never disconnected from the Internet, this would result in the message never being displayed to the user. The subsequent instruction to cancel the message could also be sent in the form of a silent push notification.

Also, if the message that is presented to the user while the user's computing device is not connected to the Internet invites a response or interaction with the user, the user's response(s) to the message could be stored in memory while the user computing device remains disconnected from the Internet. Once Internet connectivity is restored, information about the user's response(s) are then forwarded to an appropriate party.

There are many situations where presenting the user with a message when the user's computing device is not connected to the Internet would be helpful or advantageous. For example, if a client software application 300 requires Internet connectivity to operate, or requires Internet connectivity for some functions, then presenting the user with a message indicating that Internet connectivity has been lost and that loss of Internet connectivity is the reason that some functionality cannot be provided would be helpful in preventing user frustration with the client software application.

An airline software application might schedule the presentation of a message to the user for when the airline knows or suspects that the user will be on a flight. One trigger condition for the message would still be that the user's computing device not be connected to the Internet. The message could offer to connect the user to the airplane WiFi network, it might offer a discount on in-flight purchases, or deliver some other message that would potentially be helpful or interesting to the user. Other client applications may wish to present a message to the user when the user's computing device is not connected to the Internet for similar reasons.

Another example is when a person is hiking in a wilderness area or perhaps on a boat at sea, and has no Internet connectivity, the user's mobile computing device may still have a GPS signal and geolocation services. Thus, a message from a mapping program or a boating chart plotter program may present a message to a user to inform the user that the user can still obtain mapping or charting services.

A hiking software application could recommend nearby trails or outdoor activities. A chart plotting program could warn of undersea dangers or obstructions. These types of messages could have triggers that include that the user computing device enter a certain geofenced area.

In some situations, the cellular network that provides a user computing device with its Internet connectivity can be overloaded. Examples include concert venues, sporting events and other large gathering spaces. Under these conditions, a message could be presented to the user during a period of no Internet connectivity to provide helpful information. For example, the message could provide advice on the easiest way to leave a concert venue.

Natural disaster scenarios are another example of how presenting the user with a message during a period of no Internet connectivity could be helpful. Such messages could provide weather alerts, information about disaster relief facilities, information about how best to safely leave a particular region, or for other reasons.

A software application that concentrates on travel functions might present a user with a message while the user is on a flight to provide the user with special deals. For example, if the travel software application knows the user will be on a flight to a particular city at a certain time, the travel software application could schedule the presentation of a message to the user while the user is on the flight, and the message could provide information about special deals on lodging or car rentals in the destination city.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module" or "unit." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 8:
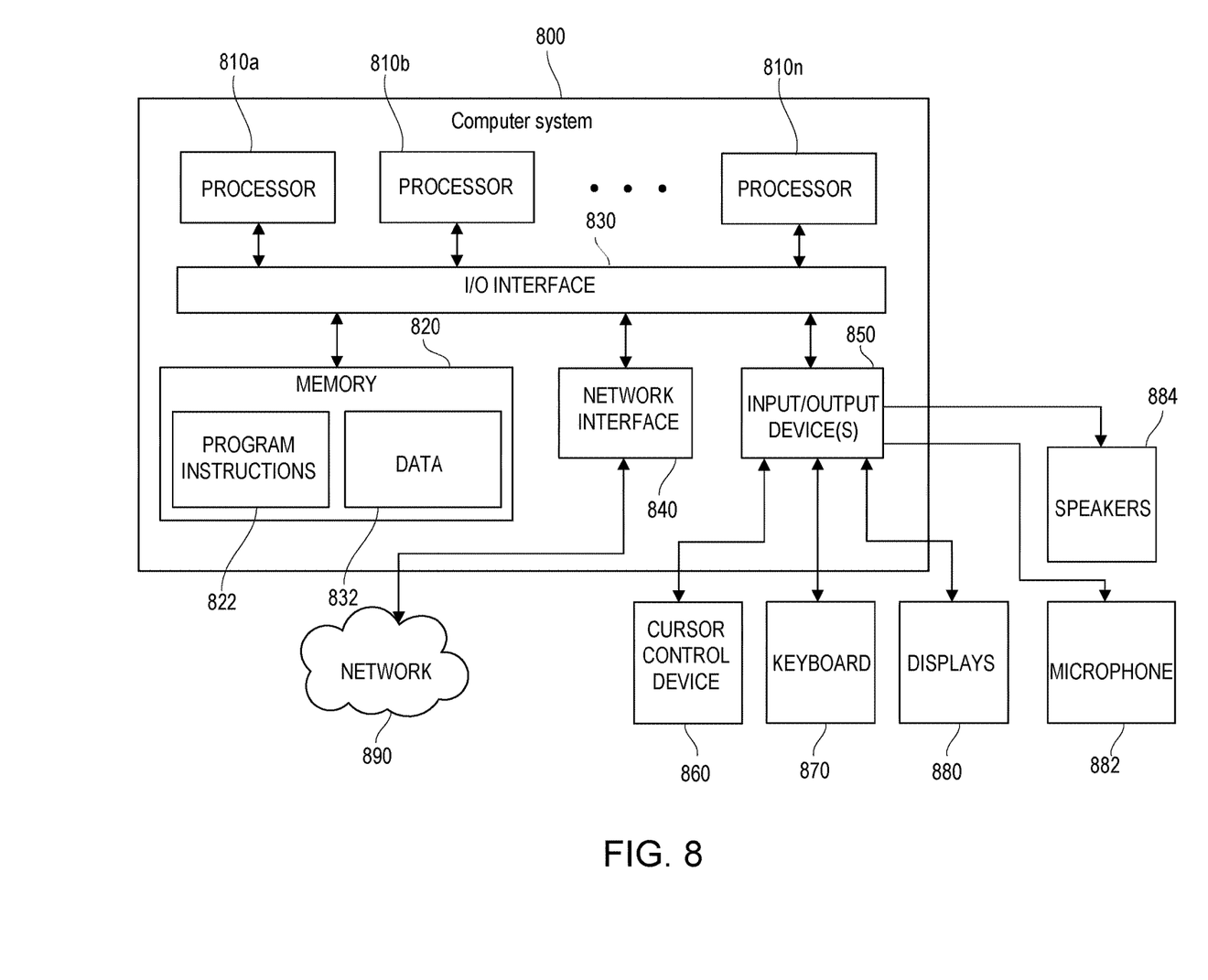
FIG. 8 is a diagram of a computer system and associated peripherals which could embody the invention, or which could be used to practice methods embodying the invention.

FIG. 8 depicts a computer system 800 that can be utilized in various embodiments of the present invention to implement the invention according to one or more embodiments. The various embodiments as described herein may be executed on one or more computer systems, which may interact with various other devices. One such computer system is the computer system 800 illustrated in FIG. 8. The computer system 800 may be configured to implement the methods described above. The computer system 800 may be used to implement any other system, device, element, functionality or method of the above-described embodiments. In the illustrated embodiments, the computer system 800 may be configured to implement the disclosed methods as processor-executable executable program instructions 822 (e.g., program instructions executable by processor(s) 810) in various embodiments.

In the illustrated embodiment, computer system 800 includes one or more processors 810a-810n coupled to a system memory 820 via an input/output (I/O) interface 830. Computer system 800 further includes a network interface 840 coupled to I/O interface 830, and one or more input/output devices 850, such as cursor control device 860, keyboard 870, display(s) 880, microphone 882 and speakers 884. In various embodiments, any of the components may be utilized by the system to receive user input described above. In various embodiments, a user interface may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, the computer system 800 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs). In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the operations and methods described above, such as the methods illustrated by the flowcharts of FIGS. 4-7. In other embodiments, different elements and data may be included.

Those skilled in the art will appreciate that the computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or nonvolatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of providing instructions for causing a message to be presented to a user on a user computing device, comprising:
   receiving information about a message that is to be presented to a user via a user computing device when the user computing device is not connected to the Internet; and
   causing a communication to be sent to the user computing device, the communication including a message template that can be used to generate the message, information about a content of the message and information about at least one trigger condition that must be satisfied before the message is presented to the user, where the at least one trigger condition includes a condition that the user computing device not be connected to the Internet.

2. The method of claim 1, wherein causing a communication to be sent to the user computing device comprises causing a push notification to be sent to a software application on the user computing device.

3. The method of claim 2, wherein the push notification sent to the user computing device is configured to cause the software application on the user computing device to present a push notification to the user.

4. The method of claim 2, wherein the push notification is sent to an operating system on the user computing device, and wherein information in the push notification is configured to cause the operating system to open the software application on the user computing device.

5. The method of claim 2, wherein the push notification is a silent push notification.

6. The method of claim 2, wherein the push notification is sent to the user computing device via a third-party push notification service.

7. The method of claim 1, wherein the information about at least one trigger condition includes a condition that the message not be presented to the user until the user computing device has not been connected to the Internet for a predetermined period of time.

8. The method of claim 1, wherein the information about at least one trigger condition includes a condition that the message is to be presented to the user only after a predetermined scheduled time.

9. The method of claim 1, wherein the information in the communication is configured to cause a software application on the user computing device to generate a message using the message template and to present the generated message to the user when the at least one trigger condition has been satisfied.

10. A system for providing instructions for causing a message to be presented to a user on a user computing device, comprising:
    means for receiving information about a message that is to be presented to a user via a user computing device when the user computing device is not connected to the Internet; and
    means for causing a communication to be sent to the user computing device, the communication including a message template that can be used to generate the message, information about a content of the message and information about at least one trigger condition that must be satisfied before the message is presented to the user, where the at least one trigger condition includes a condition that the user computing device not be connected to the Internet.

11. A system for providing instructions for causing a message to be presented to a user on a user computing device, comprising:
    a message sending unit that receives information about a message that is to be presented to a user via a user computing device when the user computing device is not connected to the Internet; and
    an in-application messaging unit that causes a communication to be sent to the user computing device, the communication including a message template that can be used to generate the message, information about a content of the message and information about at least one trigger condition that must be satisfied before the message is presented to the user, where the at least one trigger condition includes a condition that the user computing device not be connected to the Internet.

12. The system of claim 11, wherein the communication that the in-application messaging unit causes to be sent to the user computing device is a push notification that is sent to an operating system of the user computing device.

13. The system of claim 12, wherein the push notification sent to the user computing device is configured to cause a software application on the user computing device to present a push notification to the user.

14. The system of claim 12, wherein information in the push notification is configured to cause the operating system to open a software application on the user computing device.

15. The system of claim 12, wherein the push notification is a silent push notification.

16. The system of claim 12, wherein the in-application messaging unit causes a third-party push notification service to send the push notification to the user computing device.

17. The system of claim 12, wherein the information about at least one trigger condition includes a condition that the message not be presented to the user until the user computing device has not been connected to the Internet for a predetermined period of time.

18. The system of claim 12, wherein the information about at least one trigger condition includes a condition that the message is to be presented to the user only after a predetermined scheduled time.

19. The system of claim 11, wherein the information in the communication is configured to cause a software application on the user computing device to generate a message using the message template and to present the generated message to the user when the at least one trigger condition has been satisfied.

* * * * *